United States Patent
Doster

(10) Patent No.: US 8,689,910 B2
(45) Date of Patent: Apr. 8, 2014

(54) IMPREGNATION BIT WITH IMPROVED CUTTING STRUCTURE AND BLADE GEOMETRY

(75) Inventor: Michael L. Doster, Janabiyah (BH)

(73) Assignee: Baker Hughes Incorporated, Houton, TX (US)

( * ) Notice: Subject to any disclaimer, the term of this patent is extended or adjusted under 35 U.S.C. 154(b) by 272 days.

(21) Appl. No.: 12/714,585

(22) Filed: Mar. 1, 2010

(65) Prior Publication Data

US 2010/0219000 A1 Sep. 2, 2010

Related U.S. Application Data

(60) Provisional application No. 61/156,732, filed on Mar. 2, 2009.

(51) Int. Cl.
*E21B 10/36* (2006.01)
(52) U.S. Cl.
USPC .......................... 175/431; 175/428; 175/425
(58) Field of Classification Search
USPC .................. 175/428, 431, 432, 434, 425
See application file for complete search history.

(56) References Cited

U.S. PATENT DOCUMENTS

| | | | |
|---|---|---|---|
| 4,991,670 A | 2/1991 | Fuller et al. | |
| 5,205,684 A | 4/1993 | Meskin et al. | |
| 6,009,962 A | 1/2000 | Beaton | |
| 6,095,265 A | 8/2000 | Alsup | |
| 6,241,036 B1 | 6/2001 | Lovato et al. | |
| 6,394,202 B2 | 5/2002 | Truax et al. | |
| 6,510,906 B1 | 1/2003 | Richert et al. | |
| 6,725,953 B2 | 4/2004 | Truax et al. | |
| 6,843,333 B2 | 1/2005 | Richert et al. | |
| 7,096,978 B2 * | 8/2006 | Dykstra et al. | 175/57 |
| 7,234,550 B2 | 6/2007 | Azar et al. | |
| 7,350,599 B2 | 4/2008 | Lockwood et al. | |
| 7,469,757 B2 | 12/2008 | Azar et al. | |
| 7,472,764 B2 | 1/2009 | Zahradnik et al. | |
| 7,497,280 B2 | 3/2009 | Brackin et al. | |
| 7,617,747 B2 | 11/2009 | Richert et al. | |
| 7,621,350 B2 | 11/2009 | Richert | |
| 7,776,256 B2 | 8/2010 | Smith et al. | |
| 7,802,495 B2 | 9/2010 | Oxford et al. | |
| 7,810,588 B2 | 10/2010 | McClain et al. | |
| 8,191,657 B2 | 6/2012 | Richert et al. | |
| 8,220,567 B2 | 7/2012 | Scott et al. | |
| 8,225,890 B2 | 7/2012 | Scott | |
| 2004/0154840 A1 | 8/2004 | Azar et al. | |
| 2007/0215390 A1 | 9/2007 | Azar et al. | |
| 2009/0084608 A1 | 4/2009 | McClain et al. | |
| 2010/0122853 A1 | 5/2010 | Scott et al. | |
| 2010/0187011 A1 | 7/2010 | Jurica et al. | |
| 2011/0061943 A1 | 3/2011 | Richert | |
| 2012/0080240 A1 | 4/2012 | Green et al. | |

* cited by examiner

*Primary Examiner* — Giovanna Wright
*Assistant Examiner* — Taras P Bemko
(74) *Attorney, Agent, or Firm* — TraskBritt

(57) ABSTRACT

A rotary drag bit for drilling subterranean formations includes a bit body having a face extending from a centerline to a gage. A plurality of blades may be disposed on the face, and may generally extend radially outwardly toward the gage. The bit may further include a plurality of discrete impregnated cutting posts, each of which may extend outwardly from an associated blade. Each discrete impregnated cutting post angles generally toward a front edge of the associated blade and generally toward the intended direction of rotation of the bit. The rotary drag bit may further include a plurality of matrix pockets disposed on the blades. The discrete impregnated cutting posts may be housed within corresponding matrix pockets.

16 Claims, 3 Drawing Sheets

IMPREGNATION BIT WITH IMPROVED CUTTING STRUCTURE AND BLADE GEOMETRY

CROSS-REFERENCE TO RELATED APPLICATIONS

This application claims priority to and the benefit of U.S. Provisional Application Ser. No. 61/156,732, filed on Mar. 2, 2009, the entire disclosure of which is incorporated herein by reference.

The present application is also related to U.S. patent application Ser. No. 13/253,676, filed Oct. 5, 2011, entitled DIAMOND IMPREGNATED CUTTING STRUCTURES, EARTH-BORING DRILL BITS AND OTHER TOOLS INCLUDING DIAMOND IMPREGNATED CUTTING STRUCTURES, AND RELATED METHODS, pending, which is a non-provisional of 61/390,020 filed Oct. 5, 2010, each of which is assigned to the Assignee of the present application.

BACKGROUND OF THE INVENTION

1. Field of the Invention

The invention disclosed and taught herein relates generally to fixed cutter or drag type bits for drilling subterranean formations and, more specifically, relates to drag bits or impregnation bits for drilling hard and/or abrasive rock formations, and especially for drilling such formations interbedded with soft and non-abrasive layers.

2. Description of the Related Art

In order to provide background information so that the invention may be completely understood and appreciated in its proper context, reference may be made to a number of prior U.S. patents as follows:

U.S. Pat. No. 6,510,906 to Richert et al., issued Jan. 28, 2003, discloses an "impregnated bit with PDC cutters in cone area." In one embodiment, a drill bit employing a plurality of discrete, post-like diamond grit impregnated cutting structures extending upwardly from abrasive particulate-impregnated blades defining a plurality of fluid passages therebetween on the bit face is disclosed. In another embodiment, PDC cutters with faces oriented in the general direction of bit rotation are placed in the cone in a bit, which is relatively shallow, to promote enhanced drilling efficiency through softer, non-abrasive formations.

U.S. Pat. No. 6,843,333 to Richert et al., issued Jan. 18, 2005, discloses an "impregnated rotary drag bit." In one embodiment, a drill bit employing a plurality of discrete, post-like abrasive, particulate-impregnated cutting structures extending upwardly from abrasive, particulate-impregnating blades defining a plurality of fluid passages therebetween on the bit face is disclosed. In another embodiment, additional cutting edges may be placed in the cone of the bit surrounding the centerline thereof.

U.S. Pat. No. 6,009,962 to Beaton, issued Jan. 4, 2000, discloses "impregnated type rotary drill bits." In one embodiment, a rotary drill comprises a bit body having a leading surface formed at least in part from solid infiltrated matrix material, a major part of the leading surface being impregnated with abrasive particles of a diamond or other superhard material. There are also mounted a plurality of larger cutting elements having cutting edges formed of superhard material that project above the surface, the larger cutting elements being so spaced as to define a substantially continuous cutting profile, so that the cutting elements in combination sweep over the entire bottom of a hole being drilled by the bit, during each revolution.

The invention disclosed and taught herein is directed to an impregnation bit with improved cutting structure and blade geometry.

BRIEF SUMMARY OF THE INVENTION

We have created a rotary drag bit for drilling subterranean formations and a method of forming a rotary drag bit for drilling subterranean formations comprising a bit body having a face extending from a centerline to a gage; a plurality of blades on the face generally extending radially outwardly toward the gage; and a plurality of discrete impregnated cutting posts; wherein each discrete impregnated cutting post extends outwardly from an associated one of the plurality of blades; and wherein each discrete impregnated cutting post angles generally toward a front edge of the associated blade of the discrete impregnated cutting post and generally toward the direction of rotation of the rotary drag bits. The rotary drag bit may further comprise a plurality of matrix pockets disposed on the plurality of blades, wherein the discrete impregnated cutting posts may be housed within one of the plurality of matrix pockets. Each matrix pocket may support the associated discrete impregnated cutting post of the matrix pocket, wherein the matrix pocket may facilitate cooling and cleaning.

The rotary drag bit may further comprise one or more of polycrystalline diamond compact (PDC) cutters. The plurality of discrete impregnated cutting posts may comprise a particulate abrasive material. The bit body may comprise a matrix-type bit body. The plurality of discrete impregnated cutting posts may be formed of a material comprising a thermally stable diamond product (TSP).

DETAILED DESCRIPTION

Figure 1:
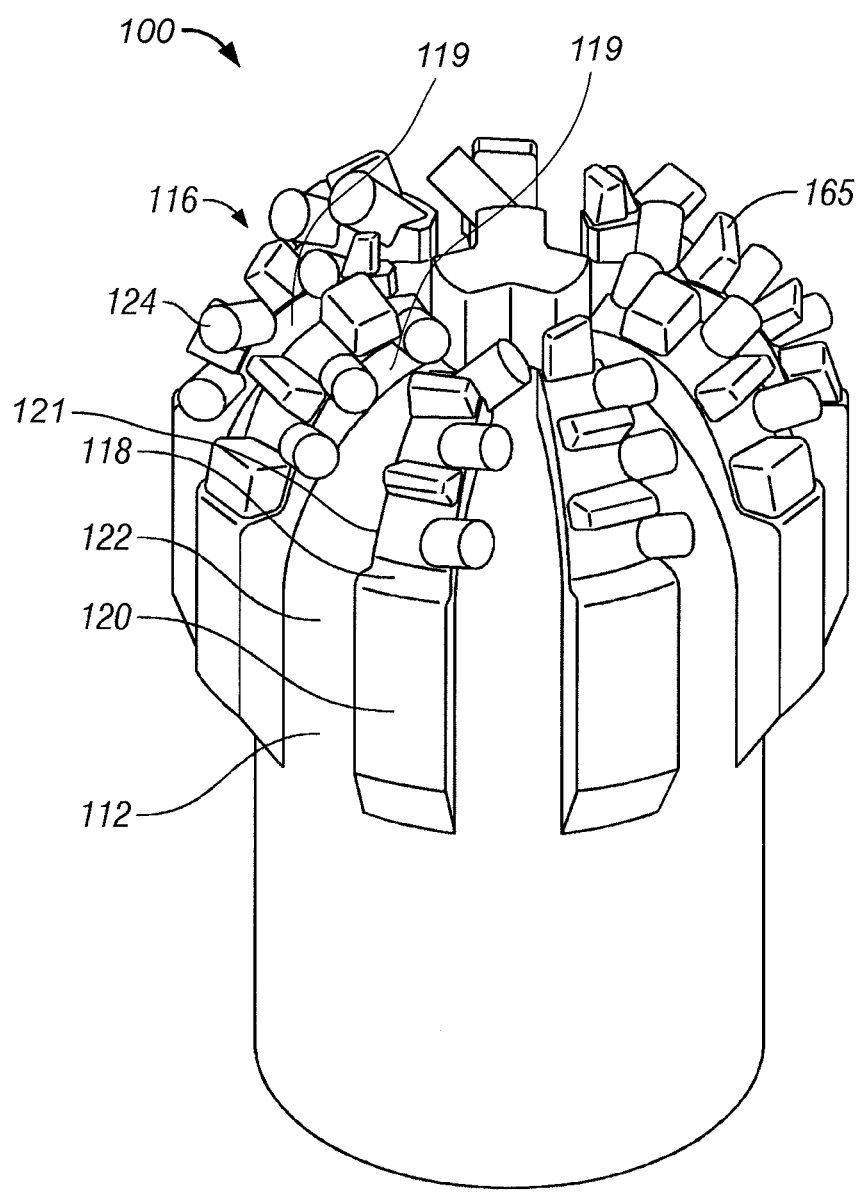
FIG. 1 illustrates an inverted perspective view of an exemplary embodiment of a rotary drill bit utilizing certain aspects of the present invention.

The figures described above and the written description of specific structures and functions below are not presented to limit the scope of what applicants have invented or the scope of the appended claims. Rather, the figures and written description are provided to teach any person skilled in the art to make and use the invention for which patent protection is sought. Those skilled in the art will appreciate that not all features of a commercial embodiment of the invention are described or shown for the sake of clarity and understanding.

Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in the art having benefit of this disclosure. It must be understood that the invention disclosed and taught herein is susceptible to numerous and various modifications and alternative forms. Lastly, the use of a singular term, such as, but not limited to, "a," is not intended as limiting of the number of items. Also, the use of relational terms, such as but not limited to "top," "bottom," "left," "right," "upper," "lower," "down," "up," "side," and the like are used in the written description for clarity in specific reference to the figures and are not intended to limit the scope of the invention or the appended claims.

We have created a rotary drag bit for drilling subterranean formations and a method of forming a rotary drag bit for drilling subterranean formations comprising a bit body having a face extending from a centerline to a gage; a plurality of blades on the face generally extending radially outwardly toward the gage; and a plurality of discrete impregnated cutting posts; wherein each discrete impregnated cutting post extends outwardly from an associated one of the plurality of blades; and wherein each discrete impregnated cutting post angles generally toward a front edge of the associated blade of the discrete impregnated cutting post and generally toward the direction of rotation of the rotary drag bits. The rotary drag bit may further comprise a plurality of matrix pockets disposed on the plurality of blades, wherein the discrete impregnated cutting posts may be housed within one of the plurality of matrix pockets. Each matrix pocket may support the associated discrete impregnated cutting post of the matrix pocket, wherein the matrix pocket may facilitate cooling and cleaning.

Impregnated or rotary drags bits are used conventionally for drilling hard and/or abrasive rock formations, such as sandstones. The impregnated drill bits typically employ a cutting face composed of superhard cutting elements, such as natural or synthetic diamond grit, dispersed within a matrix of wear-resistant material. As such bit drills, the matrix and diamonds may wear, worn cutting elements may be lost, and new cutting elements may be exposed. These diamond elements may either be natural or synthetic, and may be cast integral with the body of the bit, as in low-pressure infiltration, or may be preformed separately, as in hot isostatic pressure infiltration, and attached to the bit by brazing or furnaced to the bit by manufacturing.

Conventional impregnated bits may generally exhibit poor hydraulic design by employing a crow's foot to distribute fluid across the bit face and providing only a minimal flow area. Conventional impregnated drill bits may generally exhibit poor cooling from minimal flow area. Further, conventional impregnated bits may not drill effectively when the bit encounters softer and less abrasive layers of rock, such as shales. When drilling through shale or other soft formations with a conventional impregnated drag bit, the cutting structure may clog quickly or "ball up" with the formation material, making the drill bit ineffective. The softer formations can also plug up fluid courses formed in the drill bit, which may cause heat buildup and premature wear of the bit. Therefore, when shale-type formations are encountered, a more hydraulically efficient bit may be desired to achieve a higher rate of penetration (ROP). It follows, therefore, that selection of a bit for use in a particular drilling operation becomes more complicated when it is expected that formations of more than one type will be encountered during the operation.

Thus, it would be beneficial to design a drill bit that (i) would perform more efficiently in soft, less abrasive formations while also providing adequate ROP in harder more abrasive formations without requiring increased WOB during the drilling process; (ii) would provide a better flow area to increase cooling; (iii) would provide additional cutting elements; (iv) minimize the wear rate and thus increase the life of the drill bit; and (v) control the wear rate by modifying the contact area through angle of attack.

FIG. 1 is an illustration of an inverted perspective view of an exemplary embodiment of a rotary drill bit utilizing certain aspects of the present invention. Rotary drill bit 100 is inverted from its normal face-down operating orientation for clarity. Rotary drill bit 100 may include matrix-type body 112 having a shank for connection to a drilling string (not shown) extending therefrom opposite bit face 116. A plurality of (in this instance, ten) blades 118 extend generally radially in an outwardly fashion to gage pads 120 defining junk slots 122 between. The blades 118 generally extend at a right angle from a surface of the body 112. The plurality of blades 118 may include discrete impregnated cutting posts 124, wear control elements 165 and polycrystalline diamond compact (PDC) cutters disposed thereon extending upwardly from the blades 118. Collectively, the discrete impregnated cutting posts 124, wear control elements 165 and PDC may be termed discrete cutting structures.

Unlike conventional discrete impregnated cutting posts, the discrete impregnated cutting posts 124 of the present invention may extend upwardly, wherein each discrete impregnated cutting post 124 may angle generally toward a front edge 119 of the associated blade of the discrete impregnated cutting post 124 and may angle generally toward the direction of rotation of the rotary drag bit 100 (as shown in FIG. 1) on blades 118 from the bit face 116. The angle may be from 10 degrees to 80 degrees. Behind each discrete impregnated cutting post 124 may be a matrix pocket 236 (shown in FIG. 2) supporting the discrete impregnated cutting post 124. This may allow the discrete impregnated cutting post 124 to be pushed to the front edge 119 of the blade to facilitate cooling and cleaning.

Wear control elements 165 may be disposed on blades 118. Wear control elements 165 may be disposed between adjacent discrete impregnated cutting posts 124 on at least one blade of the blades 118 and may extend across the at least one blade from proximate a front edge 119 of the at least one blade to proximate a trailing edge 121 of the at least one blade. At least a portion of the surface of the at least one blade between the front edge 119 and the trailing edge 121 may be recessed between adjacent wear control elements 165 and behind at least one of the discrete impregnated cutting posts 124. Furthermore, the at least a portion of the surface of the at least one blade may be configured to allow fluid to pass over the at least a portion of the surface during use.

The discrete impregnated cutting posts 124, wear control elements 165, and PDCs may be integral parts of the blades 118 projecting from a matrix-type bit body 112 by hand packing diamond-grit impregnated matrix material in mold cavities on the interior of the bit mold defining the locations of the discrete cutting structures 124 and the blades 118. It is noted that the discrete cutting structures 124 may be placed directly on the bit face 116, dispensing with the blades 118.

However, it is preferable that the discrete cutting structures 124 are located on the blades 118. It is also noted that, while discussed in terms of being integrally formed with the rotary drill bit 100, the discrete cutting structures 124 may be formed as discrete individual segments, such as by hot isostatic pressure, which are subsequently brazed or furnaced onto the rotary drill bit 100.

Discrete cutting structures may be mutually separated from each other to promote drilling fluid flow therearound for enhanced cooling and clearing of formation material removed by the diamond grit. It is also noted that the rotary drill bit may comprise only one type of the discrete impregnated cutting posts 124, wear control elements 165, and PDCs or may include combinations of two or more of the types of discrete cutting structures.

Figure 2:
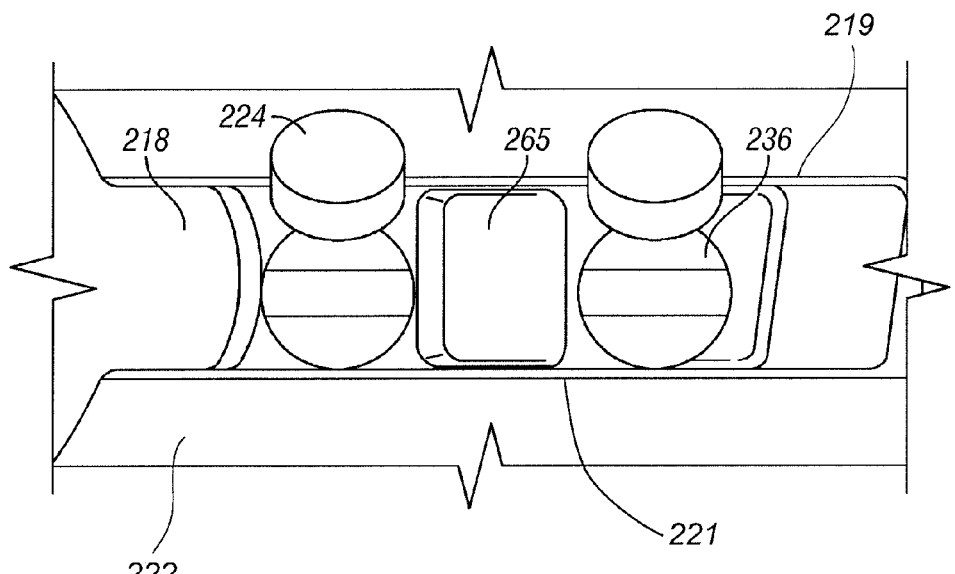
FIG. 2 illustrates a schematic top elevation of portions of a plurality of blades of the rotary drill bit of FIG. 1 comprising a plurality of discrete impregnated cutting posts.

FIG. 2 is an illustration of a schematic top elevation of portions of a plurality of blades of the rotary drill bit of FIG. 1 comprising a plurality of discrete impregnated cutting posts as is depicted in FIG. 1. Traditionally, discrete impregnated cutting post 224 in impregnation bits would be placed in the center and supported by a blade 218. Unlike traditional impregnation bits, in the exemplary embodiment depicted in FIG. 2, a matrix pocket 236 may be inserted adjacent to a wear control element 265 extending from proximate a front edge 219 of the blade 218 to proximate a trailing edge 221 and behind the discrete impregnated cutting post 224 to support or house the discrete impregnated cutting post 224. This may allow the discrete impregnated cutting post 224 to be pushed to the front edge 219 of the blade to facilitate cooling and cleaning. By including the matrix pocket 236, cooling and cleaning may be increased by allowing fluid to flow over the discrete impregnated cutting posts down a junk slot 222. Traditionally, flow was not as effective because of the limited space between discrete cutting protrusions and distance from the junk slot 222. The embodiment shown in FIG. 2 may allow the fluid to better flow and thus cool the discrete cutting structures, including the discrete impregnated cutting post 224 due to it being located closer to the junk slot 222 and due to the space created behind the discrete impregnated cutting post 224 and above the matrix pocket 236. The matrix pocket may be composed of superhard cutting elements, such as natural or synthetic diamond grit, dispersed within a matrix of wear-resistant material or other suitable material to a person of skill in the art.

Figure 3:
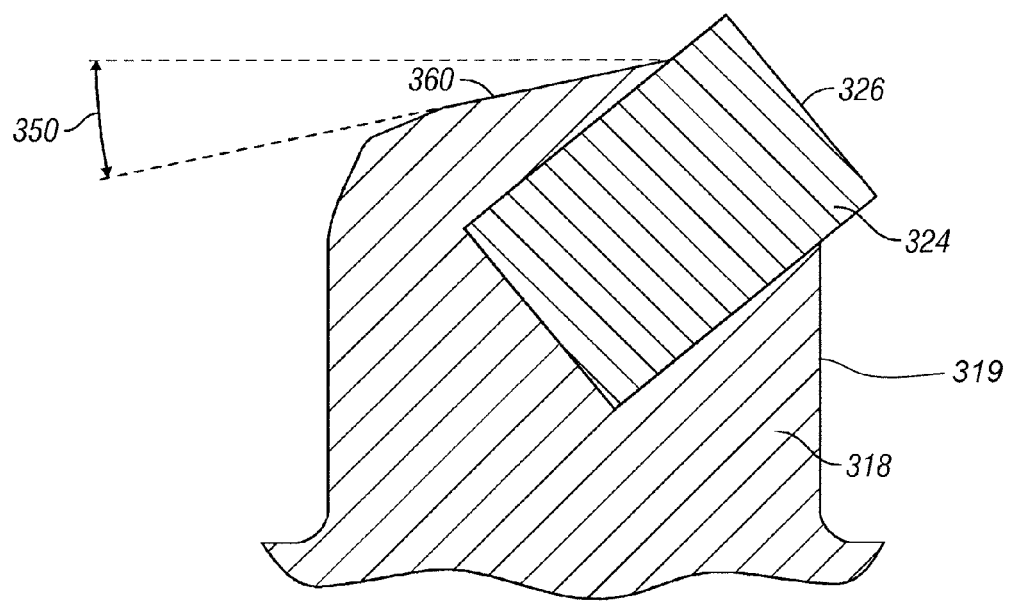
FIG. 3 illustrates a cross-sectional elevation of one of the plurality of blades of the rotary drill bit of FIG. 1 comprising one of the plurality of discrete impregnated cutting posts.

FIG. 3 is an illustration of a cross-sectional elevation of one of the plurality of blades of the rotary drill bit of FIG. 1 comprising one of the plurality of discrete impregnated cutting posts. Discrete impregnated cutting post 324 is shown projecting at an angle generally toward a front edge 319 of an associated blade 318 of the discrete impregnated cutting post 324 and may angle generally toward the direction of rotation of the rotary drag bit 100 (as shown in FIG. 1) on blades 318.

Discrete impregnated cutting posts 324 may be generally of a round or circular transverse cross-section at their substantially flat, outermost ends 326. While the discrete impregnated cutting posts 324 are illustrated as exhibiting posts of circular outer ends, other geometries are contemplated. For example, while not depicted in the figures, the discrete impregnated cutting posts 324 may be configured as ovals having a major diameter and a minor diameter. The base portion adjacent to the blade 318 might also be oval having a major and minor diameter wherein the base has a larger minor diameter than the outermost end 326 of the discrete impregnated cutting posts 324. As the discrete impregnated cutting posts 324 wears toward the blade 318, the minor diameter may increase, resulting in a larger surface area. Furthermore, the ends of the discrete impregnated cutting posts 324 may employ sloped geometries. In other words, the discrete impregnated cutting posts 324 may change cross-sections at multiple intervals, and tip geometry may be separate from the general cross-section of the cutting structure. Other shapes or geometries may be configured similarly. It is also noted that the spacing between individual discrete impregnated cutting posts 324, as well as the magnitude of the taper from the outermost ends 326 to the blades 318, may be varied to change the overall aggressiveness of the rotary drill bit 100 (shown in FIG. 1) or to change the rate at which the bit is transformed from a light-set bit to a heavy-set bit during operation. It is further contemplated that one or more of such discrete impregnated cutting posts 324 may be formed to have substantially constant cross-sections if so desired, depending on the anticipated application of the bit 100.

Discrete impregnated cutting posts 324 may comprise a synthetic diamond grit, such as DSN-47 Synthetic diamond grit, commercially available from DeBeers of Shannon, Ireland, which has demonstrated superior toughness to natural diamond grit. The tungsten carbide matrix material with which the diamond grit is mixed to form discrete impregnated cutting posts 324 and supporting blades 318 is preferably a fine grain carbide, such as, for example, DM2001 powder commercially available from Kennametal Inc., of Latrobe, Pa. Such a carbide powder, when infiltrated, provides increased exposure of the diamond grit particles in comparison to conventional matrix materials due to its relatively soft, abradable nature.

It is noted, however, that alternative particulate abrasive materials may be suitably substituted for those discussed above. For example, the discrete impregnated cutting posts 324 may include natural diamond grit, a combination of synthetic and natural diamond grit. Alternatively, the cutting structures may include synthetic diamond pins.

Figure 4:
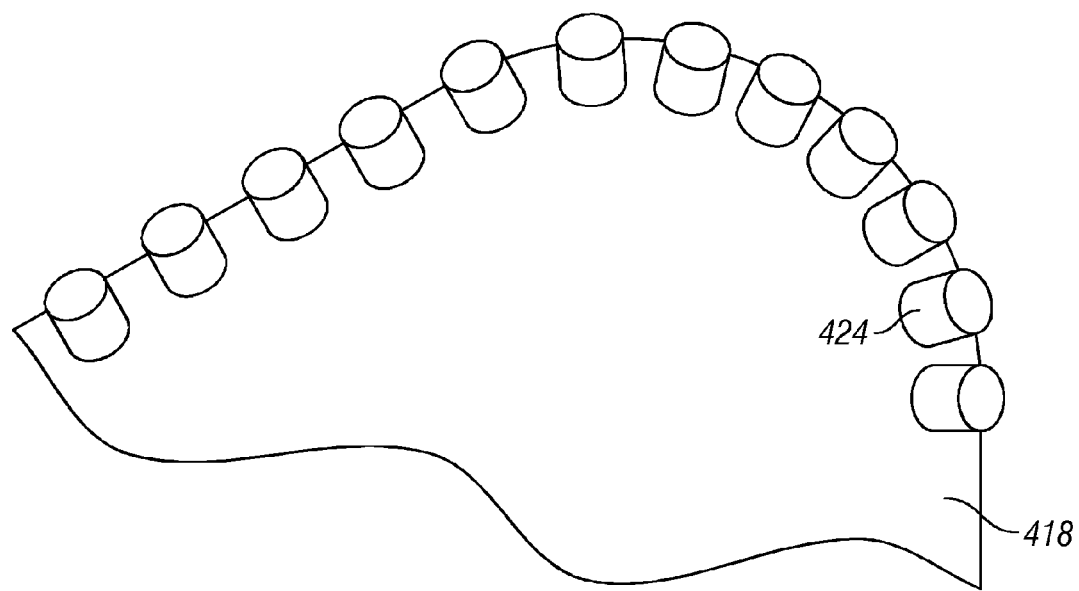
FIG. 4 illustrates a side sectional elevation of one of the plurality of blades of the rotary drill bit of FIG. 1 comprising a plurality of discrete impregnated cutting posts.

FIG. 4 is an illustration of a side sectional elevation of one of the plurality of blades of the rotary drill bit of FIG. 1 comprising a plurality of discrete impregnated cutting posts. Discrete impregnated cutting posts 424 may be angled generally toward a front edge of the associated blade of the discrete impregnated cutting post 424 and may angle generally toward the direction of rotation of the rotary drag bits, thus creating a high backrake angle (shown in FIG. 3). Adding the one or more discrete impregnated cutting posts 424 at a high backrate may decrease the effective length of the discrete impregnated cutting posts 424 when laying them out on one or more blades 418. Therefore, additional clearance between the discrete impregnated cutting posts 424 may be created and thus additional discrete impregnated cutting posts 424 may be added to the one or more blades 418. As a result, the number of discrete impregnated cutting posts 424 on a certain surface of a bit may be increased, thus improving the bit's performance. This allows for an increase in discrete impregnated cutting posts 424 density due to the increased internal clearance. It should be appreciated that each of the plurality of discrete cutting posts may be set at different backside rake angles 350 (see FIG. 3) to increase the density of the discrete impregnated cutting posts or increase the performance of the drill bit.

The increased backside rake angle 350 may provide other benefits including allowing greater control of the wear rate of the rotary drag bit 100. By increasing the backside rake angle 350, the geometry of the matrix pocket of the blade 418 may be controlled to add as much taper as is needed. This may allow the wear rate to be controlled based on the rake angle and may improve the bit's performance.

Figure 5:
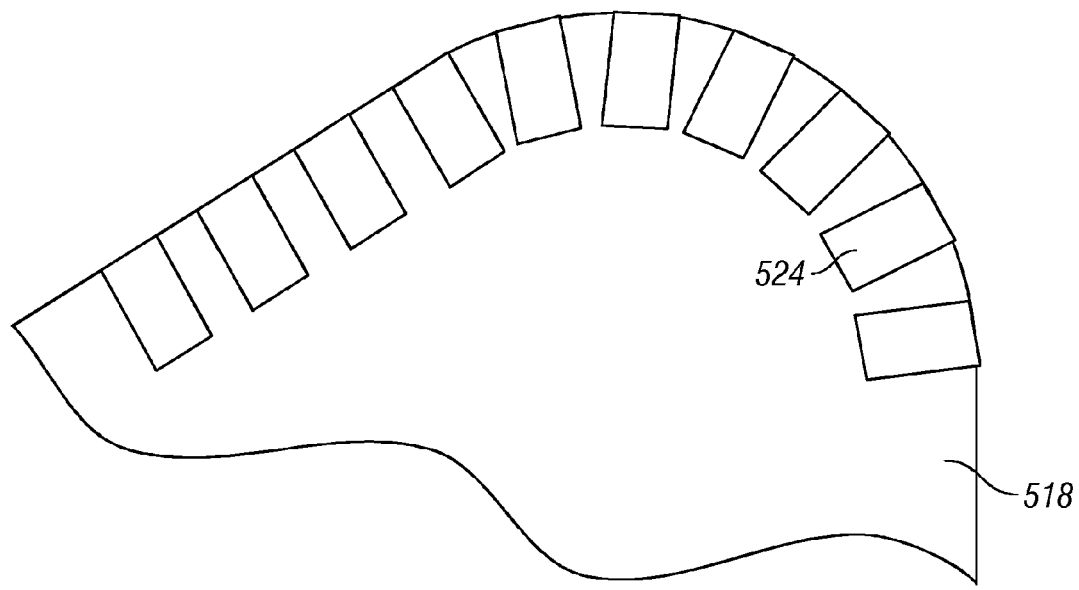
FIG. 5 illustrates a cross-sectional elevation of one of the plurality of blades of the rotary drill bit comprising a plurality of discrete impregnated cutting posts, which generally protrude perpendicular to the blade.

FIG. 5 is an illustration of a cross-sectional elevation of one of the plurality of blades of the rotary drill bit comprising a plurality of discrete cutting protrusions, which generally protrude perpendicular to the blade. FIG. 5 illustrates how discrete cutting protrusions 524 protruding generally perpendicularly to a blade 518 may not create the clearance and additional number of discrete impregnated cutting posts 424 (shown in FIG. 4) that are created when the blades are at a high backrake and thus angled generally toward a front edge of the associated blade of the discrete impregnated cutting post 424 and may angle generally toward the direction of rotation of the rotary drag bits, thus creating a high backrake angle 350, as is shown in FIGS. 3 and 4.

Other and further embodiments utilizing one or more aspects of the invention described above can be devised without departing from the spirit of the invention. For example, wear control elements, PDCs, and other non-post discrete cutting structures may be included with the discrete posts of the present invention to create other embodiments. Further, the various methods and embodiments of the impregnation bit with improved cutting structure and blade geometry can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention, but rather, in conformity with the patent laws, it is intended to fully protect all such modifications and improvements that come within the scope or range of equivalent to the following claims.

What is claimed is:

1. A rotary drag bit for drilling subterranean formations comprising:
    a bit body having a face extending from a centerline to a gage;
    a plurality of blades on the face generally extending radially outwardly toward the gage, each blade of the plurality of blades having a front edge and a trailing edge;
    a plurality of discrete impregnated cutting posts, each discrete impregnated cutting post of the plurality of discrete impregnated cutting posts extending outwardly from at least one blade of the plurality of blades, oriented to angle generally toward a front edge of the at least one blade and generally toward a direction of a rotation of the rotary drag bit, and located proximate the front edge of the at least one blade; and
    a plurality of wear control elements disposed on the at least one blade, each wear control element of the plurality of wear control elements disposed between adjacent discrete impregnated cutting posts of the plurality of discrete impregnated cutting posts and extending across the at least one blade from proximate the front edge of the at least one blade to proximate a trailing edge of the at least one blade, such that at least a portion of a surface of the at least one blade between the front edge of the at least one blade and the trailing edge of the at least one blade is recessed between adjacent wear control elements of the plurality of wear control elements and behind at least one discrete impregnated cutting post of the plurality of discrete impregnated cutting posts and is configured to allow fluid to pass over the at least a portion of the surface during use.

2. The rotary drag bit of claim 1, further comprising a plurality of matrix pockets disposed on the plurality of blades, wherein each discrete impregnated cutting post is housed within an associated one of the plurality of matrix pockets.

3. The rotary drag bit of claim 2, wherein each matrix pocket supports the associated discrete impregnated cutting post.

4. The rotary drag bit of claim 3, wherein the matrix pockets of the plurality of matrix pockets facilitate cooling and cleaning of the associated discrete impregnated cutting posts.

5. The rotary drag bit of claim 1, wherein the plurality of discrete impregnated cutting posts and the plurality of blades are integrally formed.

6. The rotary drag bit of claim 1, wherein the plurality of discrete impregnated cutting posts comprises a particulate abrasive material.

7. The rotary drag bit of claim 6, wherein the particulate abrasive material comprises at least one of synthetic diamond grit and natural diamond grit.

8. The rotary drag bit of claim 1, wherein the bit body comprises a matrix-type bit body.

9. The rotary drag bit of claim 1, wherein the plurality of discrete impregnated cutting posts are formed of a material comprising a thermally stable diamond product (TSP).

10. The rotary drag bit of claim 1, wherein the blades of the plurality of blades on the face extend radially outwardly in a generally perpendicular direction from a surface of the bit body.

11. A method of forming a rotary drag bit for drilling subterranean formations comprising:
    forming a body having a centerline and face extending from a centerline to a gage;
    forming a plurality of blades on the face generally extending radially outwardly toward the gage, each blade of the plurality of blades having a front edge and a trailing edge;
    forming a plurality of discrete impregnated cutting posts, each discrete impregnated cutting post of the plurality of discrete impregnated cutting posts extending outwardly from at least one blade of the plurality of blades, oriented to angle toward a front edge of the at least one blade of the plurality of blades and generally toward a direction of rotation of the rotary drag bit, and located proximate the front edge of the at least one blade; and
    forming a plurality of wear control elements disposed on at least one blade, each wear control element of the plurality of wear control elements disposed between adjacent discrete impregnated cutting posts of the plurality of discrete impregnated cutting posts and extending across the at least one blade from proximate the front edge of the at least one blade to proximate the trailing edge of the at least one blade, such that at least a portion of a surface of the at least one blade of the plurality of blades between the front edge of the at least one blade and the trailing edge of the at least one blade is recessed behind the each discrete impregnated cutting post of the plurality of discrete impregnated cutting posts and allows fluid to pass over the at least a portion of the surface during use.

12. The method of claim 11, further comprising forming a plurality of matrix pockets disposed on the plurality of blades, wherein each discrete impregnated cutting post is housed within an associated one of the plurality of matrix pockets.

13. The method of claim 12, wherein each matrix pocket is formed to support the associated discrete impregnated cutting post within the matrix pocket.

14. The method of claim 13, wherein the matrix pockets of the plurality of matrix pockets facilitate cooling and cleaning of the associated discrete impregnated cutting posts.

15. The method of claim 11, further comprising integrally framing the plurality of discrete impregnated cutting posts and the plurality of blades.

16. The method of claim 11, wherein each discrete impregnated cutting post is angled to control a wear rate of the discrete impregnated cutting post.

\* \* \* \* \*

UNITED STATES PATENT AND TRADEMARK OFFICE
CERTIFICATE OF CORRECTION

| | |
|---|---|
| PATENT NO. | : 8,689,910 B2 |
| APPLICATION NO. | : 12/714585 |
| DATED | : April 8, 2014 |
| INVENTOR(S) | : Doster |

It is certified that error appears in the above-identified patent and that said Letters Patent is hereby corrected as shown below:

On the title page:
ITEM (73) delete "Houton," insert --Houston,--

In the claims:
CLAIM 11, COLUMN 8, LINE 60, delete "the each discrete" insert --each discrete--
CLAIM 15, COLUMN 9, LINE 8, delete "framing the" insert --forming the--

Signed and Sealed this
Twenty-fifth Day of August, 2015

Michelle K. Lee
*Director of the United States Patent and Trademark Office*